April 30, 1940.  J. M. BAER  2,198,597
METHOD OF SURFACE MOISTENING GRAIN
Filed Sept. 30, 1938
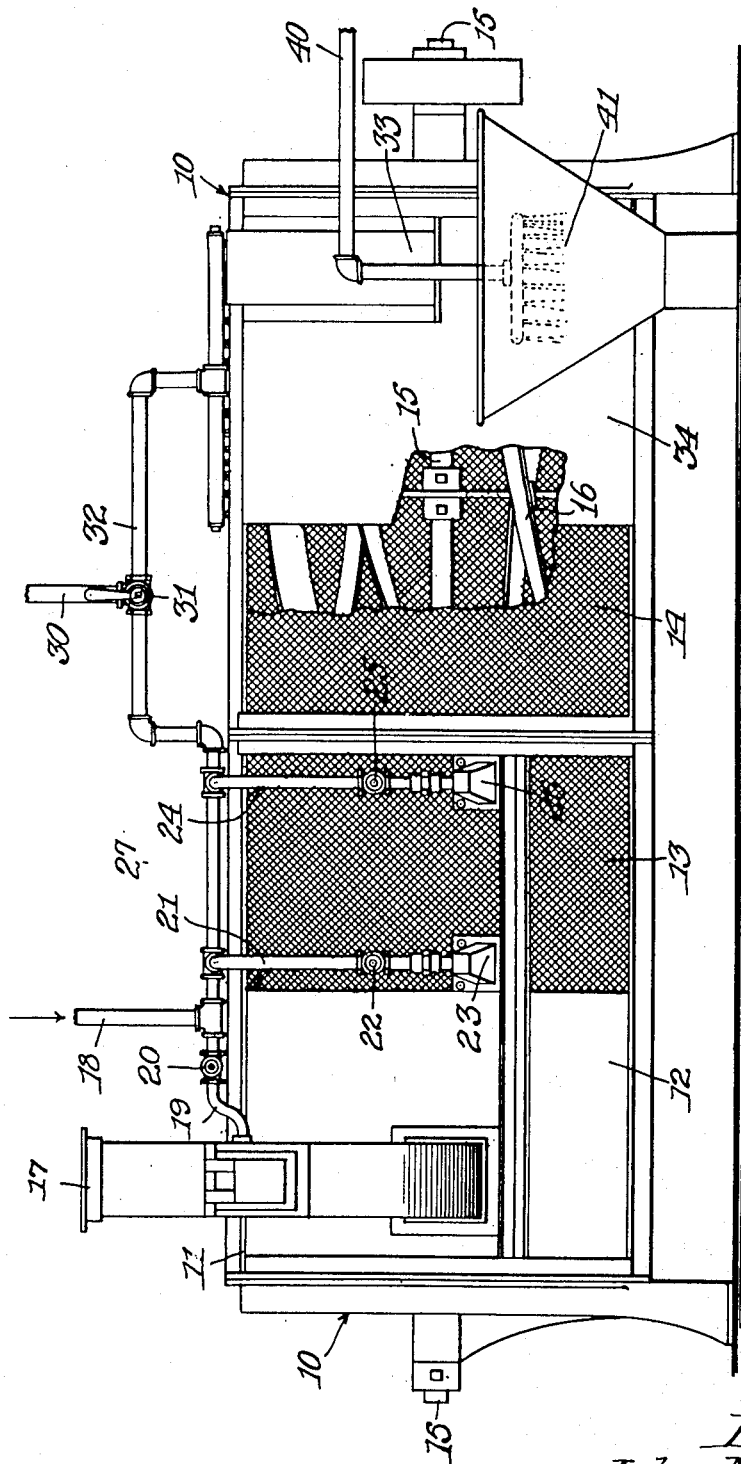
Inventor:
John M. Baer,
By Britton, Wiles, Davies, Hirschl & Dawson,
Attys.

Patented Apr. 30, 1940

2,198,597

UNITED STATES PATENT OFFICE 2,198,597

METHOD OF SURFACE MOISTENING GRAIN

John M. Baer, Chicago, Ill., assignor to The Guardite Corporation, a corporation of Illinois Application September 30, 1938, Serial No. 232,688

1 Claim. (Cl. 83—27)

This invention relates to a method of moistening grain and more particularly to a method of moistening wheat by the addition of a surface film of moisture thereto as a preliminary to prompt treatment of the material in a steam system such as that described in my co-pending application Serial No. 126,706, filed February 19, 1937.

As described in that application, grain is supplied with a surface film of moisture, is then subjected to a vacuum, followed by steaming during which the moisture is transferred from the surface film to the interior of the grain.

This invention is designed to be operated with a system such as therein described.

The invention is illustrated somewhat diagrammatically in the drawing, which represents a typical well known Wolf wheat washing machine 10. The device comprises a cylinder 11 which is roughly divided into zones 12, 13 and 14.

Within the cylinder is a shaft 15 driven in any conventional manner and upon which is mounted a series of spiral beaters 16 which are shown in the cut away portion of the drawing. These beaters extend the entire length of the drum and support the wheat.

Dry wheat is admitted to the gate 17 and passes into the first zone 12. Water is admitted through the line 18 to a manifold from which one pipe 19 leads to the gate 17. This water is controlled by valve 20. A second water line 21 controlled by valve 22 admits water to the spray 23. A third line 24 controlled by valve 25 admits water to the spray 26. Spray 26 may or may not be employed as desired.

Copious amounts of water are supplied through these lines and the wheat is thoroughly washed. By reason of the rapidly rotating beaters, however, the surplus water is driven from the wheat through the screen 27 which surrounds the drum about zones 13 and 14.

After the wheat has been washed, the latter part of the apparatus is customarily employed for the complete removal of water. In accordance with this invention, however, water is substantially completely removed by the beaters and then a controlled and measured amount of water is added through the line 30 controlled by a three-way valve 31 and leading to the manifold 32. Water may be admitted as surplus from the wash water line 18 if desired, or it may be separately metered through line 30. A plate 34 may be used to enclose this end of the apparatus, but where small amounts of water are employed it has not been found necessary.

The wheat is discharged through the outlet 33 directly into a hopper 41 from which it passes to further operations, in this case going directly to a tempering tank such as is described in my co-pending application 126,706.

The amount of water which adheres to the washed wheat after agitation by the beaters will vary in accordance with the type of wheat and its condition, but may be readily determined by simple tests. In ordinary cases, it will be around 2%. For any given type and condition of wheat the adhering water is substantially constant. A predetermined amount is then added through the manifold 32 controlled by valve 31. For example, with a total of 375 pounds of wheat per minute passing through the apparatus 11¼ pounds of water per minute are supplied to it when it is desired to add 3% of water beyond that already adhering to the material.

When it is desired to add more than a total of about 5%, it has been found that there is a tendency of the water to run off from the grain and separate in the hopper. It has been discovered, however, that if the maximum amount of water which the grain will carry is added in the washing machine, an additional 1% or more may be added just as the grain goes into the hopper through the outlet 33. This water mixes sufficiently in movement of the grain through the hopper 41 and into the vacuum chamber to secure a substantially uniform distribution thereof, at least when coupled with a steam treatment which the grain later receives. Moreover, for some reason which is not completely understood, this water does not run off as would the same amount of water if added in the washing machine. A spray 40 for adding this material may be supplied directly below the outlet. With moist grain there is no need for this supplementary treatment, but with extremely dry grain such as characterized the 1936 crop, it is frequently desirable.

Water pressure should of course be maintained constant in any desired manner.

The amount of water left in the grain in the predetermined agitation may likewise be controlled to some extent by regulation of the speed of rotation of the beaters and the amount of wheat in the washer. Increase in the amount of wheat decreases the amount of water thrown off. Likewise, although surprisingly, increase in speed of rotation of the beaters decreases the amount of water thrown off in certain ranges. For instance, increase from the normal 380 R. P. M. to about 400 R. P. M. slightly increases the retained moisture.

While the amount of water left on grain under various circumstances differs, when any particular type of grain is employed in any particular type of apparatus, the retained moisture is remarkably constant and may be employed as a basis for the addition of any further predetermined amount. By proceeding in accordance with this combination of steps, it is possible to avoid weighing the grain before and after it enters the washing machine, which otherwise would be essential to a reasonably accurate determination of the amount of surface moisture added.

This application is a continuation-in-part of my co-pending application Serial No. 160,338, filed August 21, 1937.

The foregoing detailed description has been given for clearness of understanding only, and no unnecessary limitations should be understood therefrom, but the appended claim should be construed as broadly as permissible in view of the prior art.

I claim:

The method of supplying a predetermined amount of moisture to grain, which comprises passing the grain through a zone of continuous centrifugal agitation, and in such passage first supplying an indeterminate amount of wash water to the grain, removing by the centrifugal agitation an indeterminate amount of wash water therefrom to leave a predetermined small quantity of residual water thereon, adding while still passing through such zone of centrifugal agitation a predetermined small quantity of water not over 3% by weight based upon the grain, and discharging the grain from such zone of centrifugal agitation before any substantial part of the predetermined proportion of water has been removed therefrom.

JOHN M. BAER.